US008279730B2

(12) United States Patent
Yuba (10) Patent No.: US 8,279,730 B2
(45) Date of Patent: Oct. 2, 2012

(54) OPTICAL DISC APPARATUS AND DATA WRITING METHOD

(75) Inventor: Akinori Yuba, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/971,141

(22) Filed: Dec. 17, 2010

(65) Prior Publication Data

US 2011/0149703 A1 Jun. 23, 2011

(30) Foreign Application Priority Data

Dec. 21, 2009 (JP) ................................. 2009-288585

(51) Int. Cl.
*G11B 7/00* (2006.01)

(52) U.S. Cl. ............... 369/53.14; 369/47.38; 369/47.14

(58) Field of Classification Search ............... 369/53.14, 369/47.38, 47.14
See application file for complete search history.

(56) References Cited

U.S. PATENT DOCUMENTS

| 5,067,128 A | 11/1991 | Nakane |
| 5,317,556 A * | 5/1994 | Tsuboi et al. ............ 369/112.19 |
| 2002/0039335 A1 | 4/2002 | Masaki et al. |
| 2002/0186633 A1 * | 12/2002 | Kai et al. ................... 369/47.51 |
| 2003/0067852 A1 * | 4/2003 | Tsukihashi et al. ........ 369/44.38 |

FOREIGN PATENT DOCUMENTS

| JP | 02-094063 A | 4/1990 |
| JP | 05-347068 A | 12/1993 |
| JP | 06-044595 A | 2/1994 |
| JP | 08-055422 A | 2/1996 |
| JP | 2002-109822 A | 4/2002 |
| JP | 2002-367176 A | 12/2002 |
| JP | 2006-252767 A | 9/2006 |

* cited by examiner

*Primary Examiner* — Latanya Bibbins
(74) *Attorney, Agent, or Firm* — Renner, Otto, Boisselle & Sklar, LLP

(57) ABSTRACT

An optical disc apparatus for performing both the operation of writing data on an optical disc and the operation of reading data that is stored on the optical disc includes a motor for rotating the optical disc, an optical pickup, which irradiates the optical disc with a light beam and detects the light that has been reflected from the optical disc, an evaluation section for obtaining an indicative parameter of the distortion of a signal waveform representing the light reflected from a data stored part on the optical disc while the optical disc is being rotated by the motor, and a control section for changing the number of revolutions of the optical disc Per unit time if a variation in the indicative parameter of the distortion per rotation of the optical disc exceeds a threshold value while the optical disc is being rotated by the motor.

6 Claims, 13 Drawing Sheets

OPTICAL DISC APPARATUS AND DATA WRITING METHOD

BACKGROUND OF THE INVENTION

1. Field of the Invention

The present invention relates to an optical disc apparatus and data writing method for minimizing the resonance (or mechanical vibrations) of an optical disc such as a DVD by detecting the magnitude of the resonance produced and by changing the number of revolutions of the optical disc before the magnitude of the resonance exceeds a predetermined value.

2. Description of the Related Art

In optical disc technologies, data can be read out from a rotating optical disc by irradiating the disc with a relatively weak light beam with a constant intensity and detecting the light that has been modulated by, and reflected from, the optical disc. A unit that emits such a light beam and detects the light reflected from an optical disc is called an "optical pickup". An optical disc is rotated by a motor.

On a read-only optical disc, information is already stored as pits that are arranged spirally during the manufacturing process of the optical disc. On the other hand, on a rewritable optical disc, a recording material film, from/on which data can be read and written optically, is deposited by evaporation process, for example, on the surface of a substrate on which tracks with spiral lands or grooves are arranged. In writing data on a rewritable optical disc, data is written there by irradiating the optical disc with a light beam, of which the optical power has been changed according to the data to be written, and locally changing the property of the recording material film.

It should be noted that the depth of the pits and tracks and the thickness of the recording material film are both smaller than the thickness of the optical disc substrate. For that reason, those portions of the optical disc, where data is stored, define a two-dimensional plane, which is sometimes called a "storage plane" or an "information plane". However, considering that such a plane actually has a physical dimension in the depth direction, too, the term "storage plane (or information plane)" will be replaced herein by another term "information storage layer". Every optical disc has at least one such information storage layer. Optionally, a single information storage layer may actually include a plurality of layers such as a phase-change material layer and a reflective layer.

In a recordable or rewritable optical disc, when data is going to be written on its information storage layer, the information storage layer is irradiated with such a light beam, of which the optical power has been modulated as described above, thereby forming an amorphous recorded mark on a crystalline phase change material layer. Such an amorphous recorded mark is left there by heating a portion of the information storage layer that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point but the recorded mark will turn crystalline again after having been cooled rapidly (i.e., the recorded mark will be erased). In this manner, the recorded mark can be rewritten over and over again. However, if the optical power of the light beam for writing data (i.e., optical recording power) had an inappropriate level, then the recorded mark would have a deformed shape and sometimes it could be difficult to read the data as intended.

Such an amorphous recorded mark has a different reflectance from its surround crystalline portions. For that reason, when a read operation is performed, the intensity of the reflected light varies depending on whether or not a recorded mark is there. In an area where data has already been written (which will be referred to herein as a "recorded area"), there is a series of recorded marks and spaces, of which the lengths are variable with the contents of the data to be written. For that reason, the optical properties (i.e., the optical reflectance and transmittance) of such a recorded area are different from those of an area where no data has been written yet (which will be referred to herein as an "unrecorded area").

To read data that is stored on an optical disc or to write data on a rewritable optical disc, the light beam always needs to maintain a predetermined converging state on a target track on an information storage layer. For that purpose, a "focus control" and a "tracking control" need to be done. The "focus control" means controlling the position of an objective lens along a normal to the surface of the information plane (such a direction will sometimes be referred to herein as "substrate depth direction") so that the focal point (or at least the converging point) of the light beam is always located on the information storage layer. On the other hand, the "tracking control" means controlling the position of the objective lens along the radius of a given optical disc (which direction will be referred to herein as an "optical disc radial direction") such that the light beam spot is always located right on a target track.

In order to perform such a focus control or a tracking control, the focus error or the tracking error needs to be detected based on the light that has been reflected from the optical disc and the position of the light beam spot needs to be adjusted so as to reduce the error as much as possible. The magnitudes of the focus error and the tracking error are represented by a "focus error (FE) signal" and a "tracking error (TE) signal", both of which are generated based on the light that has been reflected from the optical disc.

An optical disc apparatus for writing information on a given optical disc such as a DVD or a Blu-ray Disc (BD) and reading the information stored on it will sometimes be prevented from performing a write operation with good stability and quality by the eccentricity or out-of-plane vibrations (which is also called "disc flutter") of the optical disc. As used herein, the "eccentricity of an optical disc" refers to a situation where the center (of mass) of a given optical disc is not aligned with the center of rotation of that optical disc being turned by a motor. The greater the magnitude of eccentricity of a given optical disc, the more significantly the center of mass of that disc moves during its rotation. As a result, mechanical vibrations will be produced in such a situation. On the other hand, the "out-of-plane vibrations" will be produced if the surface of a given optical disc is not quite perpendicular to the center of rotation of that disc being turned by a motor. In that case, as the optical disc rotates, the interval between the optical pickup and the surface of the optical disc will vary periodically. Nevertheless, even if the given optical disc has eccentricity or produces out-of-plane vibrations, the light beam can still follow the target tracks on the target information storage layer of that optical disc by performing the focus control or tracking control described above, unless the degree of such eccentricity or out-of-plane vibrations is excessive.

A conventional optical disc apparatus (which will be sometimes referred to herein as an "optical drive") includes a signal processor for determining whether the write quality of a read signal that has been obtained by an optical pickup is good or bad and for removing signal components representing the optical disc's eccentricity or out-of-plane vibrations from that read signal. Meanwhile, as there is a growing demand for personal computers (PCs) of even smaller sizes, the overall sizes and thicknesses of optical drives have been further reduced lately.

Japanese Patent Applications Laid-Open Publications Nos. 2006-252767, 8-55422, 5-347068, 6-44595, 2-94063 and 2002-109822 disclose techniques for decreasing the number of revolutions of an optical disc when the level of a servo signal or a data read error exceeds a reference level.

The driving force of conventional optical pickups was high enough to keep up with the eccentricity of a given optical disc. Lately, however, as the overall sizes or thicknesses of optical drives have been reduced, the driving force of recent optical pickups have become too low to keep up with the resonances to be produced by the eccentricity of a given optical disc.

An optical disc apparatus (decoder) that can read and write from/to both DVDs and BDs usually has two objective lenses for DVDs and BDs, respectively. If an optical pickup were designed with the objective lens for DVDs prioritized, then the center of mass of the optical pickup would lose balance when a read/write operation is performed using an objective lens for BDs. That is why when a so-called "slim drive" with two lenses performs a read/write operation using an objective lens for BDs, the resonances produced due to the eccentricity of an optical disc are no longer negligible. As used herein, the "slim drive" refers to an optical disc drive with a thickness of 12.7 mm (=0.5 inches) or less. In a slim drive, the optical pickup to use also needs to have a reduced size. However, if resonances were produced due to the eccentricity of the optical disc being rotated, it would be difficult, more often than not, for such an optical pickup of a reduced size for a slim drive to direct a light beam toward a target location on the optical disc.

If resonances were produced due to the eccentricity of an optical disc, a recorded mark formed on an information storage layer of the optical disc could have a deformed shape or have its location shifted from the target one. And if data were written in such an unintentional state, a read error should occur when such data is read.

It is therefore an object of the present invention to provide an optical disc apparatus and data writing method that can minimize such resonances while a given optical disc is rotating.

SUMMARY OF THE INVENTION

An optical disc apparatus according to the present invention is designed to perform both the operation of writing data on an optical disc and the operation of reading data that is stored on the optical disc. The apparatus includes: a motor for rotating the optical disc; an optical pickup, which irradiates the optical disc with a light beam and detects the light that has been reflected from the optical disc; an evaluation section for obtaining an indicative parameter of the distortion of a signal waveform representing the light reflected from a data stored part on the optical disc while the optical disc is being rotated by the motor; and a control section for changing the number of revolutions of the optical disc per unit time if a variation in the indicative parameter of the distortion per rotation of the optical disc exceeds a threshold value while the optical disc is being rotated by the motor.

In one preferred embodiment, the indicative parameter of the distortion of the signal waveform is at least one of a $\beta$ value, the degree of asymmetry, the degree of modulation, and a jitter.

In another preferred embodiment, the optical disc apparatus includes a measuring section for measuring the magnitude of eccentricity of the optical disc being rotated by the motor. When the magnitude of eccentricity of the optical disc measured exceeds a reference value, the evaluation section detects the indicative parameter of the distortion.

In this particular preferred embodiment, the measuring section measures the magnitude of eccentricity of the optical disc based on the light that has been reflected from the optical disc.

In a specific preferred embodiment, the apparatus has a size of 12.7 mm (which is comparable to 0.5 inches) or less as measured perpendicularly to the optical disc.

In still another preferred embodiment, the apparatus is used as a recording device in a mobile personal computer.

A data writing method according to the present invention is a method for writing data on an optical disc and includes the steps of: A) rotating the optical disc; B) writing data on the optical disc by irradiating the optical disc with a light beam while rotating the optical disc; C) irradiating an area of the optical disc on which the data has been written with a light beam, thereby obtaining an indicative parameter of the distortion of a signal waveform representing its reflected light; and D) changing the number of revolutions of the optical disc per unit time if a variation in the indicative parameter of the distortion per rotation of the optical disc exceeds a threshold value.

In one preferred embodiment, the data writing method further includes the step of measuring the magnitude of eccentricity of the optical disc. If the magnitude of eccentricity of the optical disc exceeds a reference value, the steps C) and D) are performed. But unless the magnitude of eccentricity of the optical disc exceeds the reference value, the steps C) and D) are not performed.

According to the present invention, if a variation in the indicative parameter of the distortion per rotation of the optical disc exceeds a threshold value, the number of revolutions of the optical disc per unit time is decreased. That is why a read/write operation can be performed with good stability even on an optical disc where resonances have been produced.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

Portion (a) of FIG. 5 shows a situation where the $\beta$ value varies a little per rotation of an optical disc, and portion (b) of FIG. 5 shows a situation where the $\beta$ value varies significantly per rotation of the optical disc.

DETAILED DESCRIPTION OF PREFERRED EMBODIMENTS

Figure 1A:
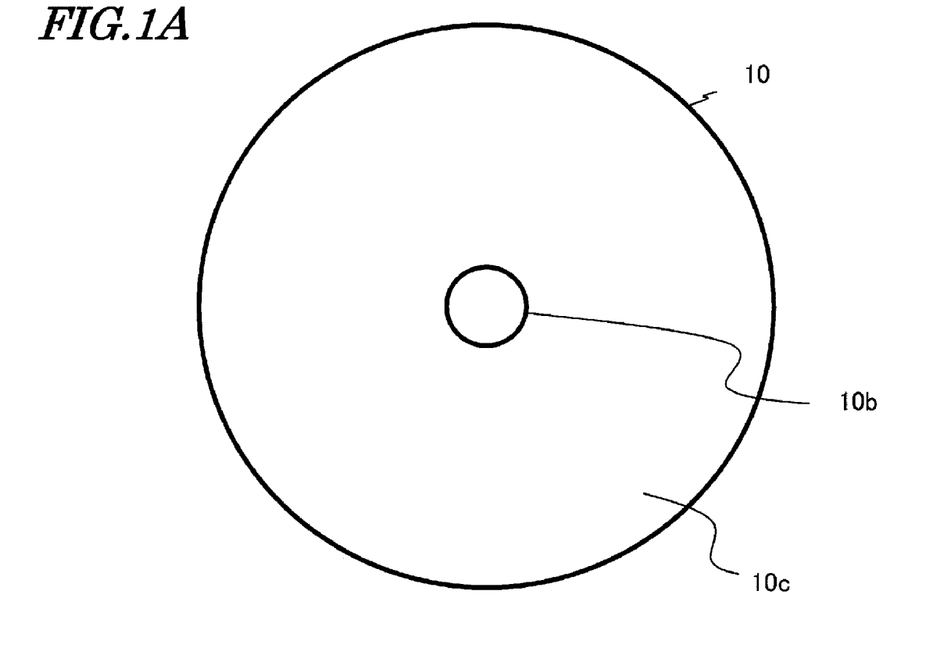
FIG. 1A is a plan view illustrating the general appearance of an optical disc.
Figure 1B:
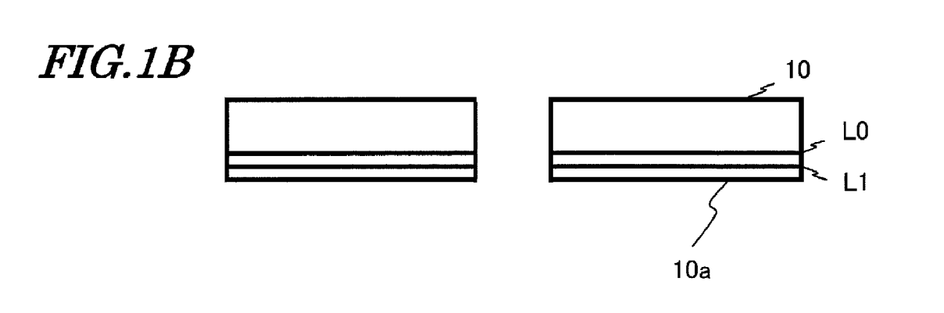
FIG. 1B is a cross-sectional view thereof, and FIG. 1C schematically illustrates a motor for rotating the optical disc.
Figure 1C:
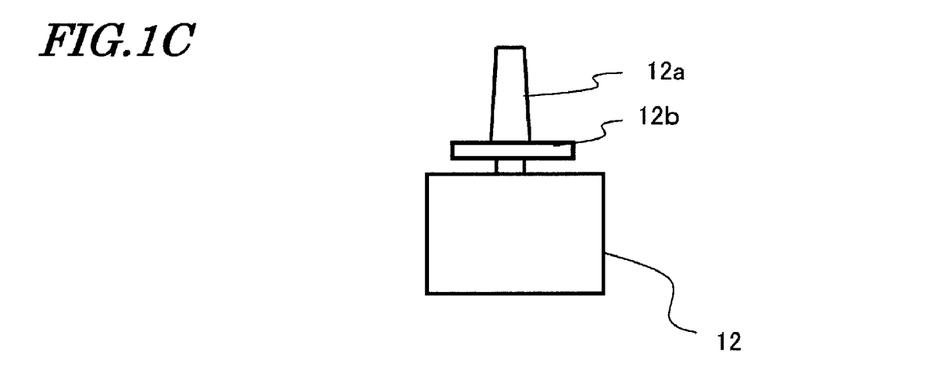

FIG. 1A illustrates an example of an optical disc 10, FIG. 1B is a schematic cross-sectional view thereof, and FIG. 1C schematically illustrates a motor 12 for rotating the optical disc 10.

The optical disc 10 shown in FIG. 1 has a first information storage layer L0, which is located more distant from the optical disc surface 10a on which a light beam is incident, and a second information storage layer L1, which is located closer to the optical disc surface 10a. However, an optical disc for use in the present invention does not always have two information storage layers but may have only one information storage layer or even three or more information storage layers as well.

The optical disc 10 has a circular hole 10b at its center, around which there is a user data area 10c where the user can write any desired data. When loaded into an optical disc apparatus, the optical disc 10 is clamped onto a supporting portion 12b so that the shaft 12a of rotation of the motor 12 stands upright through the hole 10b of the optical disc 10 as shown in FIG. 1C. And when the motor 12 starts running, the optical disc 10, along with the shaft 12a and the supporting portion 12b, begins to turn around the center of rotation.

Figure 2:
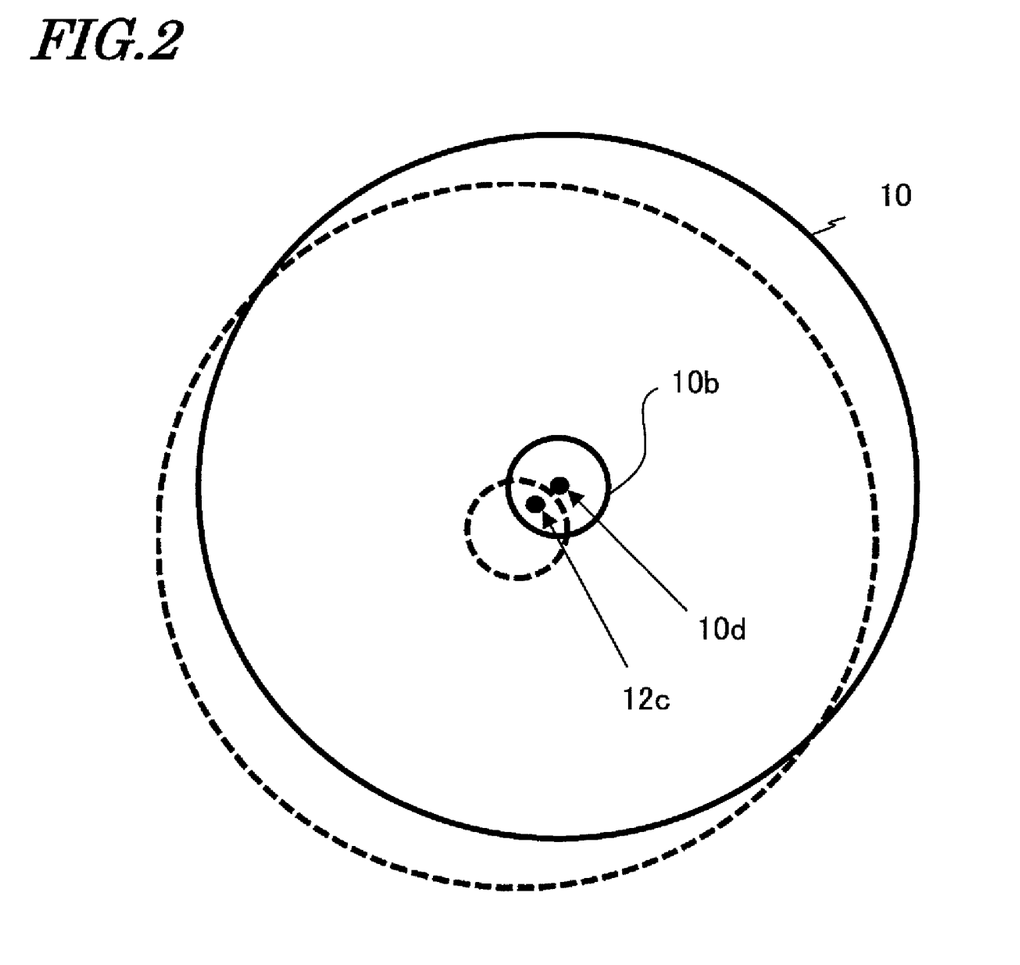
FIG. 2 schematically illustrates an optical disc with eccentricity.

The center of mass of the optical disc 10 agrees with the center of the optical disc 10. When the optical disc 10 is loaded into an optical disc apparatus, however, the center of the optical disc 10 cannot always be aligned with the center of rotation of the motor 12 but some deviation could be caused between them. Such deviation is usually called "eccentricity". FIG. 2 schematically illustrates the positions of the optical disc 10 at two different points in time in a situation where the optical disc 10 is rotating with such eccentricity. In FIG. 2, a certain position of the optical disc 10 is indicated by the solid circle. At this position, the center 10d of the optical disc 10 agrees with the center of its hole 10b. FIG. 2 also indicates, by the dashed circle, the position of the optical disc 10 that has turned a half way around from the position indicated by the solid circle. The magnitude of eccentricity is defined by the distance between the center 10d of the disc and the center 12c of rotation.

Hereinafter, an exemplary configuration for an optical drive according to the present invention will be described with reference to FIG. 3.

Figure 3:
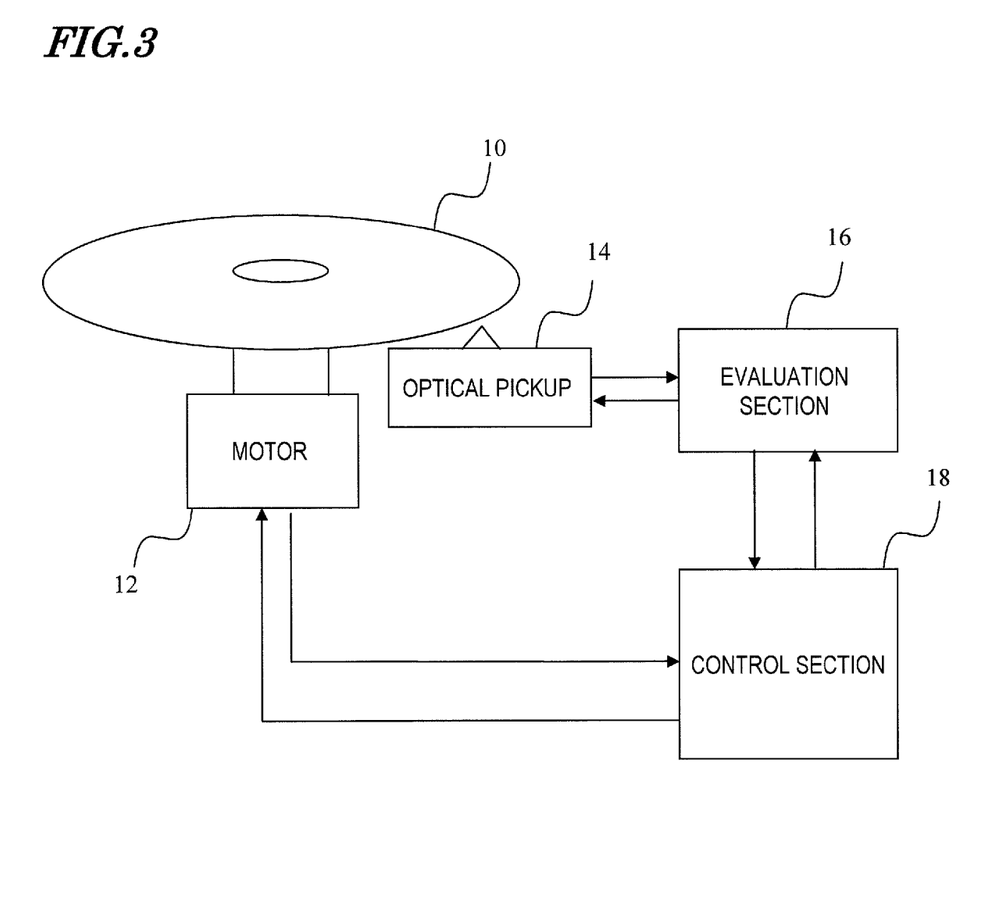
FIG. 3 is a block diagram illustrating an exemplary configuration for an optical disc apparatus according to the present invention.

The optical drive shown in FIG. 3 performs both the operation of writing data on the optical disc 10 and the operation of reading data that is stored on the optical disc 10. The drive includes a motor 12 for rotating the optical disc 10 and an optical pickup 14, which irradiates the optical disc 10 with a light beam and detects the light that has been reflected from the optical disc 10.

The optical drive further includes an evaluation section 16 and a control section 18. The evaluation section 16 gets the light that has been reflected from a data stored part on the optical disc 10 detected by the optical pickup 11 while the optical disc 10 is being rotated by the motor 12 and obtains an indicative parameter of the distortion of a signal waveform representing the reflected light. The indicative parameter of the distortion of a signal waveform is the value of a particular evaluation parameter such as a β value to be described later. On the other hand, the control section 18 changes the number of revolutions of the optical disc 10 per unit time if a variation in the indicative parameter of the distortion per rotation of the optical disc 10 exceeds a threshold value while the optical disc 10 is being rotated by the motor 12.

Hereinafter, the indicative parameter of the distortion of a signal waveform (which will be simply referred to herein as an "indicative parameter") will be described.

First of all, a β value will be described with reference to FIG. 4.

Figure 4:
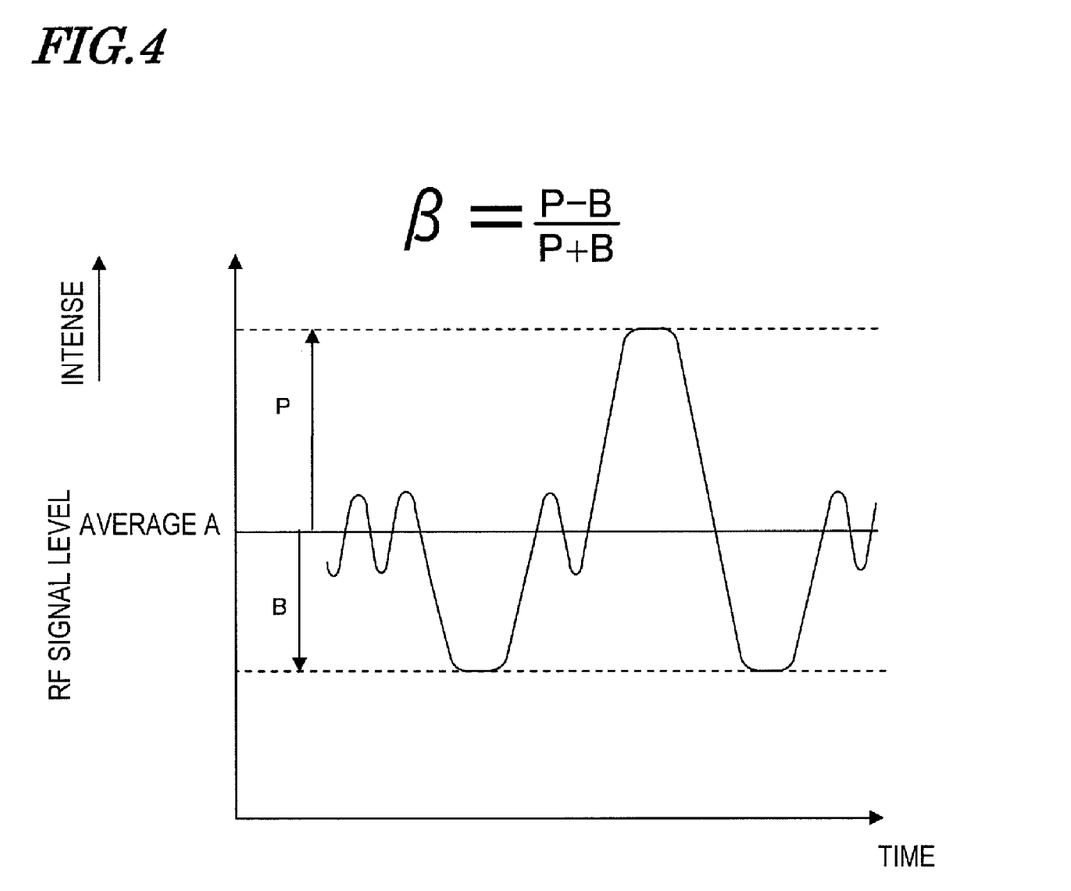
FIG. 4 shows what a $\beta$ value is.

FIG. 4 is a graph schematically showing the waveform of a read signal (RF signal) obtained from a data stored area. To obtain such a read signal, first of all, data is written on at least one target track by irradiating the track with a writing light beam. Any kind of data may be written there in this case. As a result, a series of recorded marks, representing the data written, is formed on that track. And the interval between two adjacent ones of the recorded marks on the track is called a "space". Suppose the reflectance at the recorded marks is lower than the one at the spaces. As a reading light beam follows the track on which data has been written, the light beam reflected from those recorded marks with a relatively low reflectance will have the lower intensity, while the light beam reflected from those spaces with a relatively high reflectance will have the higher intensity. In the exemplary waveform shown in FIG. 4, portions of the RF signal waveform, which are lower than its average, represent the intensity of the light beam that has been reflected from the recorded marks, while other portions of the RF signal waveform, which are higher than its average, represent the intensity of the light beam that has been reflected from the spaces. Once the shape of a recorded mark has been deformed or has had its location shifted, the intensity of the light beam reflected from that recorded mark would be different from that of the light beam reflected from a non-deformed one at the exact location, even if their lengths are the same.

If the upper and lower portions of the read signal waveform, which are located over and under the average A of the RF signal shown in FIG. 4, have their amplitudes identified by P and B, respectively, the β value is given by $(P-B)/(P+B)$. The higher the degree of symmetry between those upper and lower portions of the read signal waveform with respect to the average A, the closer to zero the β value gets. In the example illustrated in FIG. 4, P>B is satisfied, and therefore, the β value is positive. Conversely, if P<B is satisfied, the β value will be negative In general, when data is going to be written, the power and waveform of a light beam are determined so that the β value gets as close to zero as possible. However, if resonances were produced due to the eccentricity of an optical disc on which data is going to be written, then an abnormal recorded mark would be formed there. In that case, the β value would be far away from zero.

Figure 5:
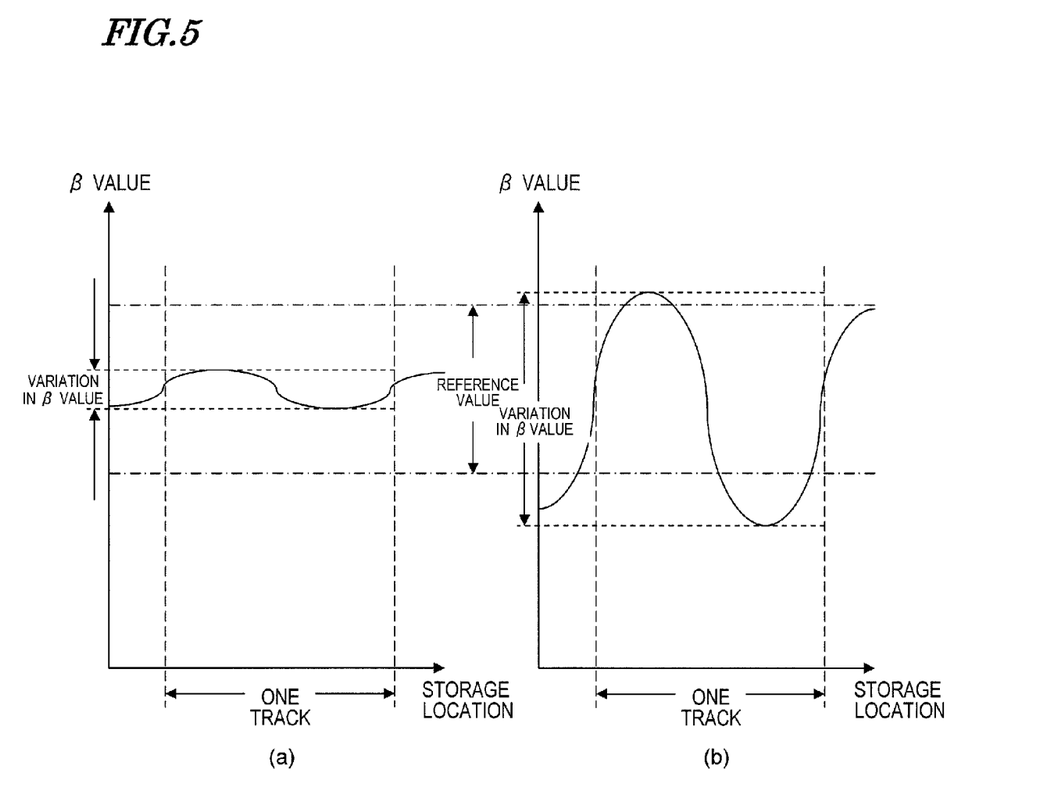

Portions (a) and (b) of FIG. 5 show how the β value varies per rotation of the optical disc. In the meantime, the light beam makes one round of a track. Portion (a) of FIG. 5 illustrates a situation where the variation in β value is relatively small. On the other hand, portion (b) of FIG. 5 illustrates a situation where the variation in β value is relatively large. If resonances are produced due to the eccentricity of an optical disc, the β value will vary significantly per rotation of the optical disc as shown in portion (b) of FIG. 5. That is why the magnitude of the variation in β value per rotation of the optical disc (which will be sometimes simply referred to herein as the "magnitude of variation") can be used effectively as an indicative parameter indicating the degree of resonances produced while data is being written (which will be simply referred to herein as the "degree of resonance").

Figure 6:
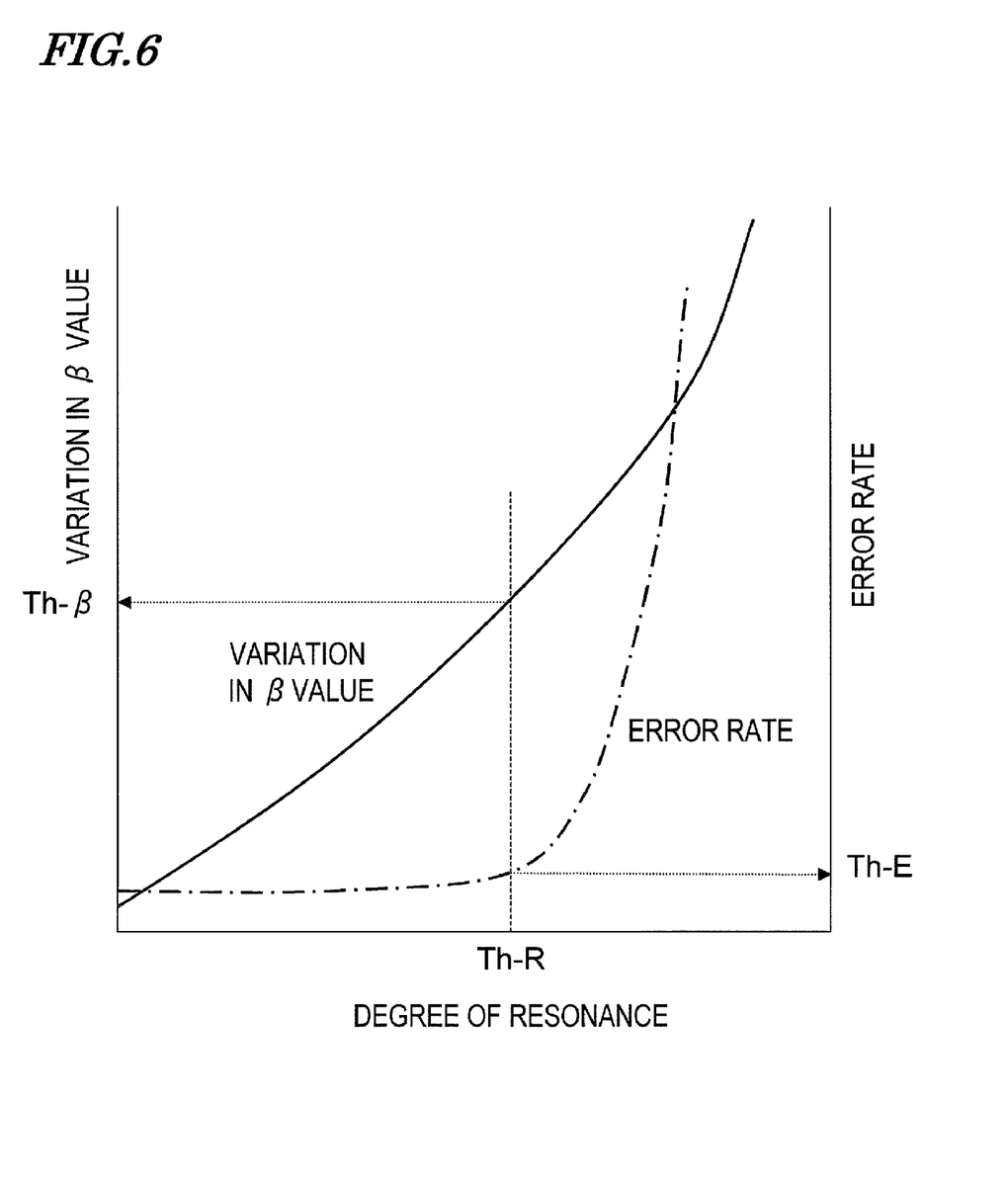
FIG. 6 is a graph showing how the magnitude of variation in $\beta$ value and the error rate change with the degree of resonance.

FIG. 6 is a graph showing how the magnitude of variation in β value changes with the degree of resonance. In the graph shown in FIG. 6, the ordinate on the left hand side represents the magnitude of variation in β value, while the abscissa represents the degree of resonance. For the purpose of comparison, a curve representing a relation between the error rate and the degree of resonance is also drawn as a one-dot chain. And the ordinate on the right hand side represents the error rate, which indicates the frequency of occurrence of errors before error correction is made.

As can be seen from FIG. 6, if the degree of resonance is relatively small, the magnitude of variation in β value rises almost linearly as the degree of resonance increases. As for the error rate, on the other hand, the error rate starts to increase steeply when the degree of resonance exceeds a certain value (which will be referred to herein as a "threshold value Th-R"). In the range where the degree of resonance is equal to or smaller than the threshold value Th-R, however, the error rate remains a substantially constant low value irrespective of the degree of resonance. If the degree of resonance is low (e.g., lower than the threshold value Th-R), the error rate has a non-zero value. Once an error correction is made, however, no data errors will occur any longer.

Figure 7:
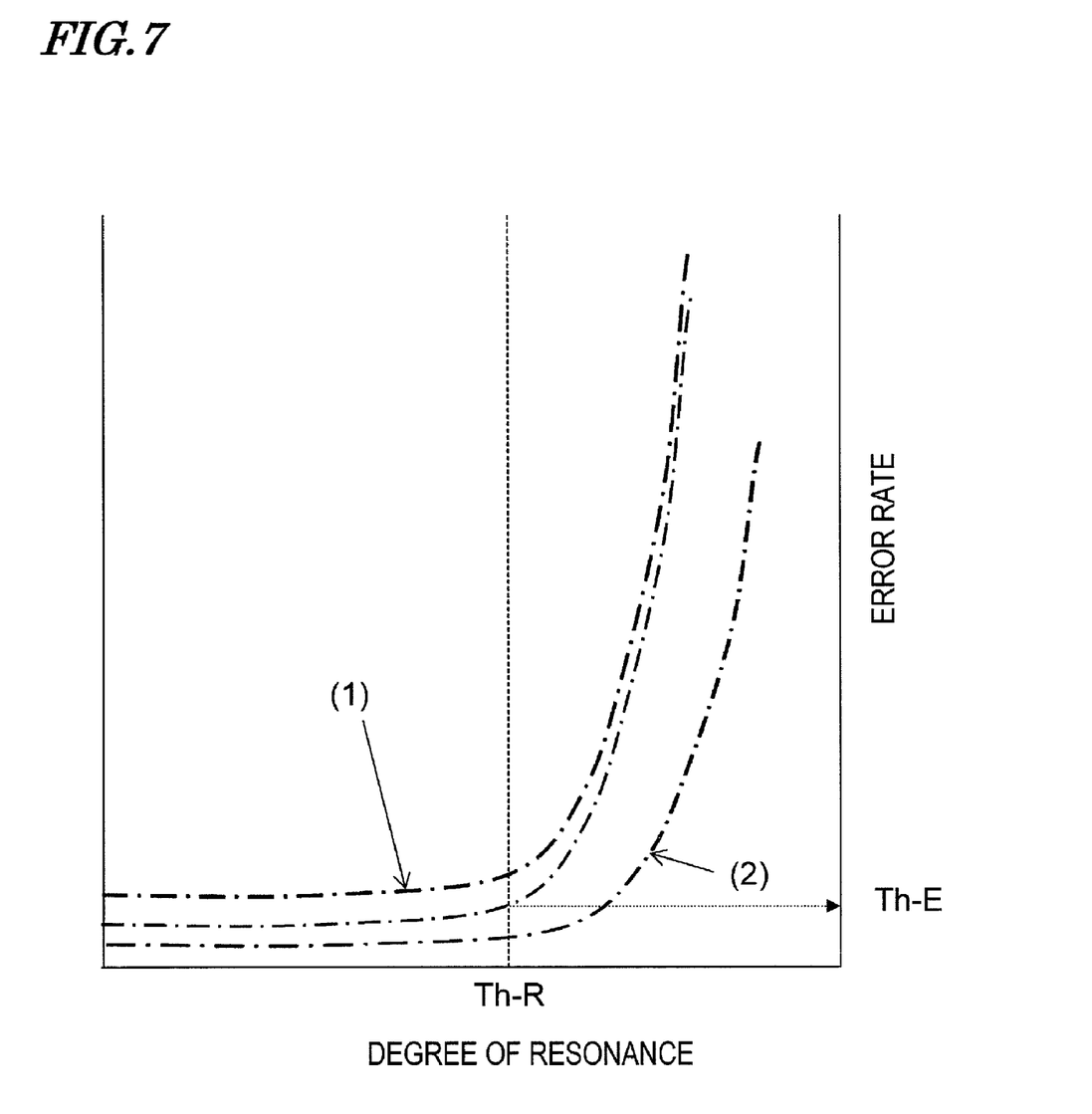
FIG. 7 is a graph showing various relations between the error rate and the degree of resonance.

In the example shown in FIG. 6, the β value at the threshold value Th-R is Th-β and the error rate at the threshold value Th-R is Th-E. In a situation where the error rate is adopted as an indicative parameter for controlling the number of revolutions of the motor, once the error rate exceeds the Th-E value, the degree of resonance may be decreased by lowering the number of revolutions of the motor. Then, it should be theoretically possible to avoid a situation where the error rate increases by leaps and bounds. Although the Th-R value itself works fine in this manner, the relation between the error rate and the degree of resonance could vary from one optical disc to another. That is why the threshold value Th-R and the value Th-E could also be different between individual discs. For that reason, even if the degree of resonance is sufficiently low, the error rate could be over the value Th-E from the beginning as indicated by the curve (1) in FIG. 7. Or even after the degree of resonance has exceeded the threshold value Th-R, the error rate might remain low as indicated by the curve (2). When the degree of resonance is relatively low, the error rate is insensitive to the degree of resonance. Consequently, it is not appropriate to sense resonances by the error rate at an early stage of the resonances.

On the other hand, as can be seen easily from FIG. 6, even in the range where the degree of resonance is relatively low, the magnitude of variation in β value is sensitive to the degree of resonance. Therefore, the magnitude of variation in β value can be used favorably as an indicative parameter of the degree of resonance. For that reason, in a preferred embodiment of the present invention, when the magnitude of variation in β value exceeds the predetermined value Th-β, the number of revolutions of the motor is decreased to change the degree of resonance.

Figure 8:
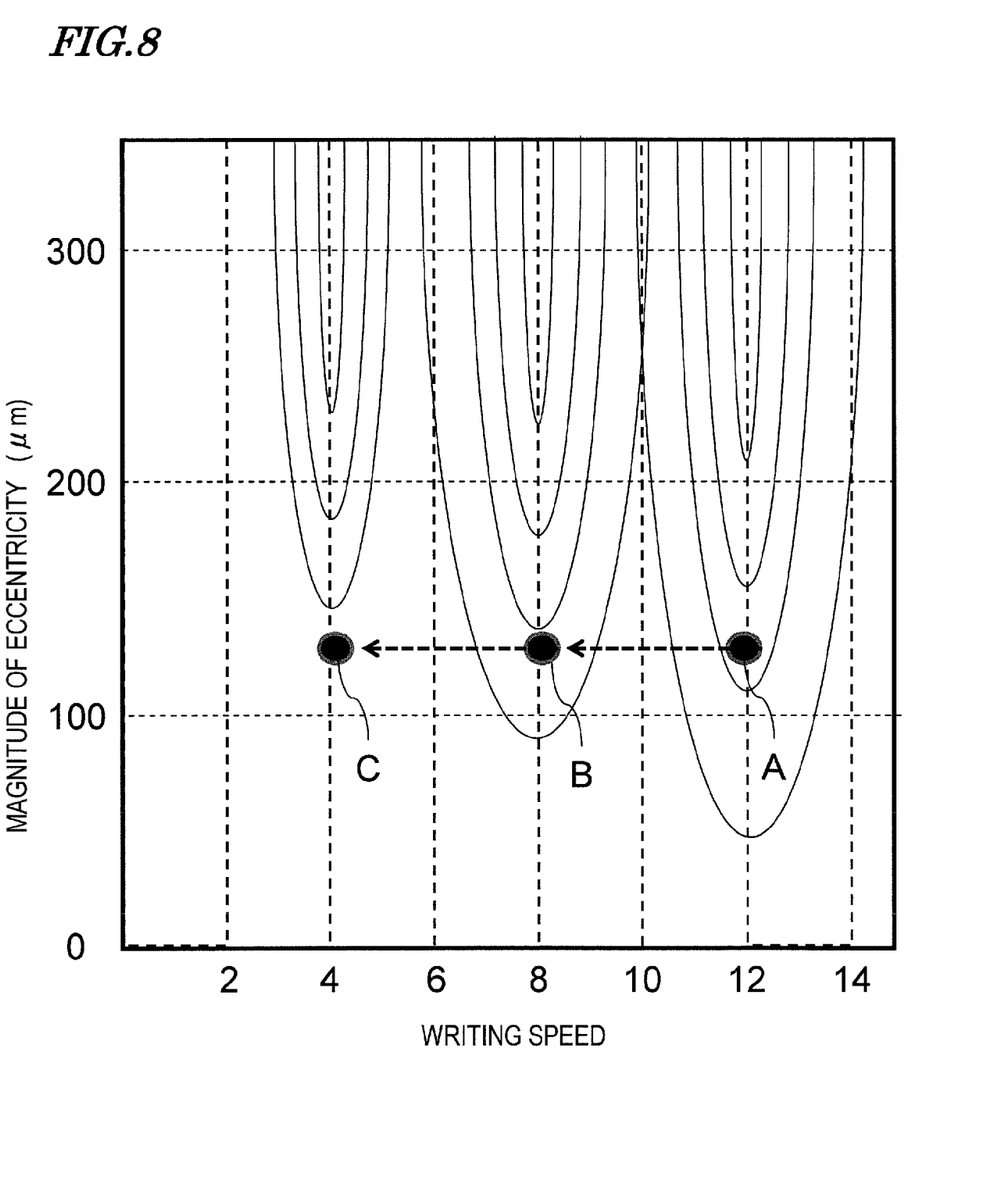
FIG. 8 schematically shows how much the degree of resonance depends on the magnitude of eccentricity and the writing speed.

FIG. 8 schematically shows how much the degree of resonance depends on the magnitude of eccentricity and the writing speed. In FIG. 8, the ordinate represents the magnitude of eccentricity and the abscissa represents the writing speed. In the example shown in FIG. 8, when the writing speed is 4×, 8× and 12×, resonances are produced even if the magnitude of eccentricity is small. The writing speed at which resonances are produced easily is different from one optical disc or drive to another. In FIG. 8, shown are three groups of curves that intersect with the axes representing the 4×, 8× and 12× writing speeds, respectively. These three groups of curves are "contour lines" indicating the degrees of resonances, so to speak. And among a number of curves that form each of these groups, the inner a curve, the more intense the resonance produced will be. But in the range outside of these groups of curves, the resonances are negligible.

Suppose an optical disc with a magnitude of eccentricity of about 125 μm is rotating. In that case, if the writing speed is 12×, the degree of resonance has a magnitude determined by Point A. But if the writing speed is decreased from 12× to 8×, the degree of resonance decreases to a magnitude determined by Point B. And if the writing speed is further decreased from 8× to 4×, the degree of resonance decreases to a magnitude determined by Point C. That is to say, the resonance produced has a negligible magnitude then. In the example shown in FIG. 8, if the writing speed is decreased from 12× to 10×, the degree of resonance decreases sufficiently. However, it is generally unknown how much the writing speed needs to be changed to decrease the degree of the resonance that has been sensed based on a variation in β value, for example.

It should be noted that the data shown in FIG. 8 is just an example and the relation between the degree of resonance, the magnitude of eccentricity, and the writing speed (i.e., the number of revolutions of the motor) is not always as shown in FIG. 8. In a preferred embodiment of the present invention, a variation in β value is measured and the number of revolutions of the motor is changed using the variation as an indicative parameter. However, the indicative parameter does not have to be β value. There are other indicative parameters that change with the degree of resonance as gently as a β value. Examples of those alternative indicative parameters include the degree of asymmetry, the degree of modulation, and a jitter.

Hereinafter, the degree of asymmetry and the degree of modulation will be described with reference to FIG. 9.

Figure 9:
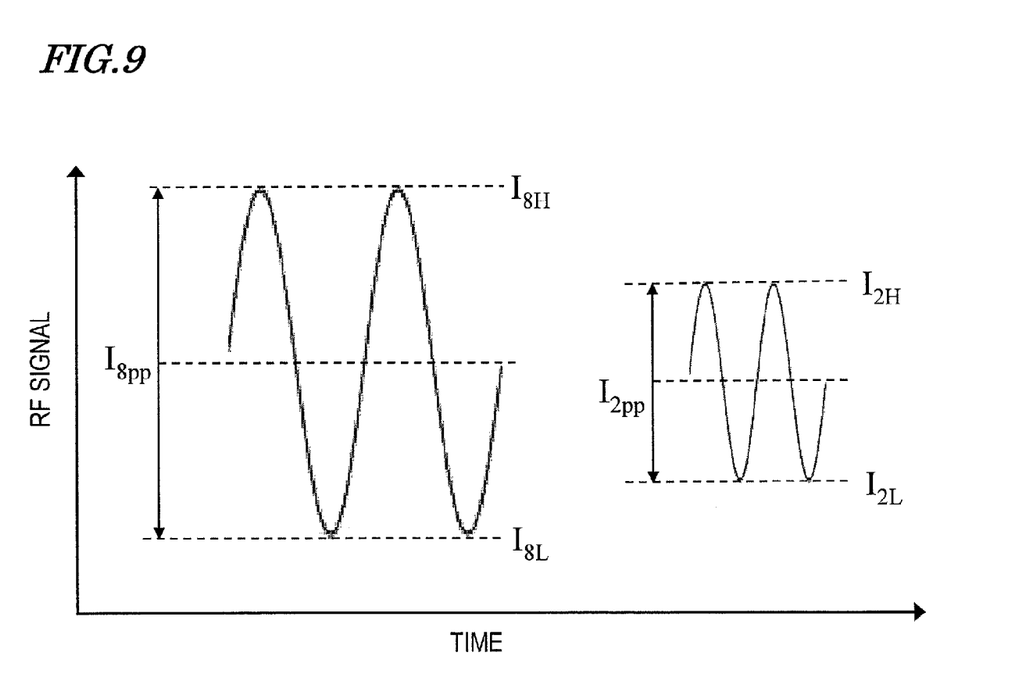
FIG. 9 illustrates the waveform of an RF signal to show what the degree of asymmetry and the degree of modulation are.

FIG. 9 is a graph showing how the intensity of the light reflected from an area on the optical disc where data is stored (as represented by the intensity of an RF signal) changes with time. The bold line shown under the waveform indicates the zero level of the signal intensity. As described above, in a data stored area of the information storage layer of an optical disc, there is a series of recorded marks along a track. The lengths of the recorded marks and spaces are determined by the data to be written (i.e., an encoded digital signal). In FIG. 9, the waveform of an RF signal, which is obtained from an area where recorded marks and spaces with the maximum code length have been formed, is shown on the left-hand side, while the waveform of an RF signal, which is obtained from an area where recorded marks and spaces with the minimum code length have been formed, is shown on the right-hand side. In this example, the write data has been modulated by 1-7 modulation, the maximum code length is 8T (where T is one channel clock period) and the minimum code length is 2T. The lengths of recorded marks and spaces actually formed are selected from the group consisting of 2T, 3T, 4T, 5T, 6T, 7T and 8T.

In this example, the highest level $I_{8H}$ of the RF signal is obtained when an 8T space is irradiated with a light beam and the lowest level $I_{8L}$ of the RF signal is obtained when an 8T recorded mark is irradiated with a light beam. On the other hand, the level of the RF signal obtained when a 2T space is irradiated with a light beam is $I_{2H}$, and the level of the RF signal obtained when a 2T recorded mark is irradiated with a light beam is $I_{2L}$. The greatest (peak-to-peak) amplitude $I_{8pp}$ is given by $I_{8H}-I_{8L}$, while the smallest amplitude $I_{2pp}$ is given by $I_{2H}-I_{2L}$.

In this example, the degree of asymmetry is calculated by the following Equation (1):

$$\frac{\frac{I_{8H}+I_{8L}}{2}-\frac{I_{2H}+I_{2L}}{2}}{I_{8pp}} \tag{1}$$

The degree of asymmetry behaves in almost the same way as the β value. On the other hand, the degree of modulation is given by the following Equation (2):

$$I_{8pp}/I_{8H} \tag{2}$$

It should be noted that the jitter is the standard deviation σ of the time variation of equalized binarized data. The leading and trailing edges of data are measured with respect to a clock signal that has been generated by a PLL (phase locked loop), and are normalized with one period of a channel clock signal.

Figure 10:
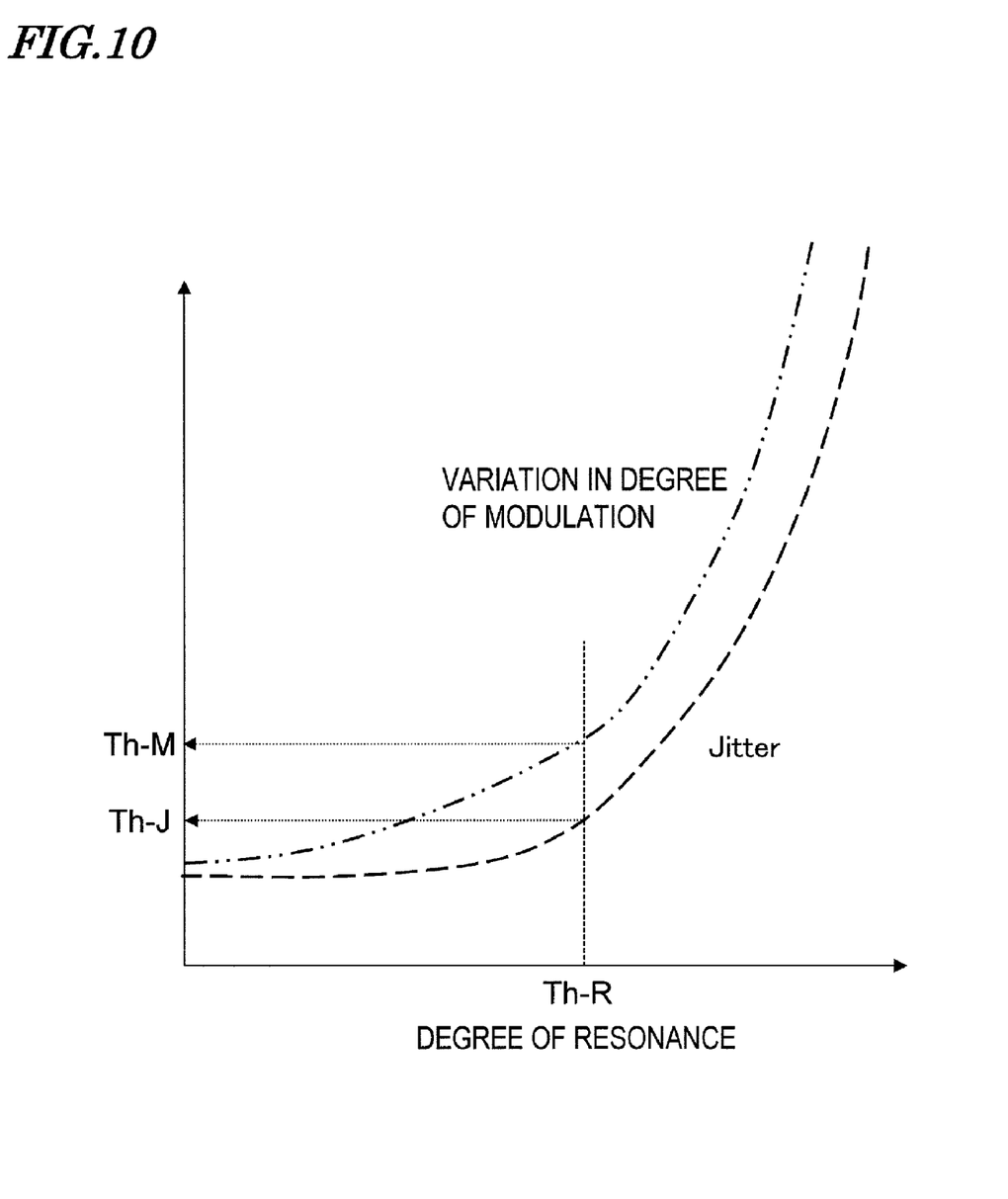
FIG. 10 is a graph showing how the degree of modulation and the jitter change with the degree of resonance.

FIG. 10 is a graph showing how the degree of modulation and the jitter change with the degree of resonance. In a range where the degree of resonance is relatively low, both the degree of modulation and the jitter change linearly according to the degree of resonance. That is why the degree of asymmetry, the degree of modulation and/or the jitter may be used instead of the β value. Among these indicative parameters, the β value and the degree of asymmetry are most preferred and the degree of modulation is the next.

Hereinafter, a specific preferred embodiment of the present invention will be described with reference to FIGS. 11 to 13.

Figure 11:
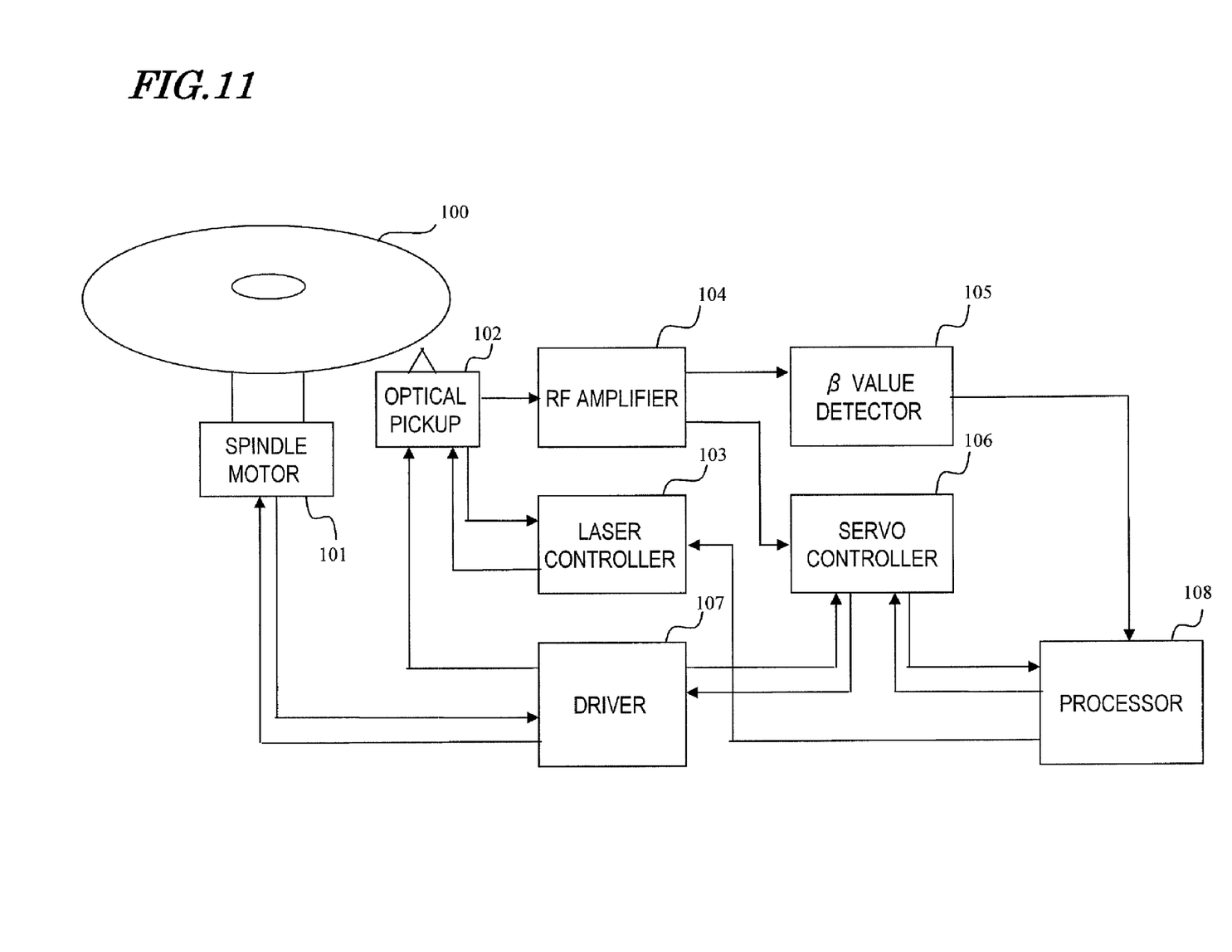
FIG. 11 is a block diagram illustrating a configuration for an optical disc apparatus as a specific preferred embodiment of the present invention.

FIG. 11 is a block diagram illustrating a configuration for an optical disc read/write drive as a specific preferred embodiment of the present invention. FIG. 12 is a block diagram illustrating a configuration for an optical pickup according to a preferred embodiment of the present invention. And FIG. 13 is a flowchart showing an exemplary procedure for changing the number of revolutions of an optical disc with the β value according to a preferred embodiment of the present invention.

First of all, the general configuration of an optical disc apparatus according to this preferred embodiment will be described with reference to FIG. 11. This optical disc apparatus is an optical disc read/write drive (which is also called simply an "optical drive") to be built in a BD recorder.

The optical drive shown in FIG. 11 includes a spindle motor 101 for rotating a given optical disc 100, an optical pickup 102 for irradiating an information storage layer of the optical disc 100 with a laser beam and detecting the returning light that has been reflected from the disc 100, a laser controller 103 for controlling the intensity and emission pattern of the laser beam, an RF amplifier 104 for amplifying the signal supplied from the optical pickup 102, a β value detector 105 for detecting the space level and/or the mark level by subjecting the amplified RF signal to AC coupling, a servo controller 106 for controlling the focus, tracking, and tilt servos and the spindle motor using the signal that has been amplified by the RF amplifier 104, an actuator/spindle motor driver 107 for driving a lens driver and the spindle motor 101 in the optical pickup 102, and a processor 108 for controlling the overall optical drive by calculating the β value and the magnitude of eccentricity.

Figure 12:
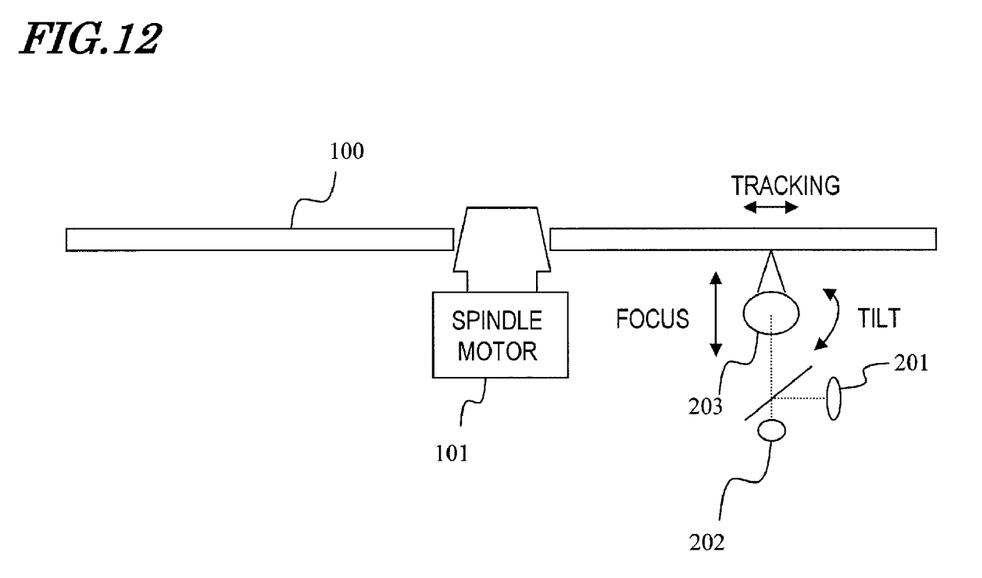
FIG. 12 is a block diagram illustrating a configuration for the optical pickup of the optical disc apparatus shown in FIG. 11.

As shown in FIG. 12, the optical pickup 102 includes a laser diode 201, which can change the intensity of its emission according to the amount of current supplied, a photodetector 202 for converting the returning laser beam that has been reflected from the optical disc 100 into an electrical signal, an objective lens 203, and an actuator (not shown) for driving the objective lens 203 to control the focus, tracking and tilt. The actuator functions as the lens driver mentioned above and is controlled by the actuator/spindle motor driver 107.

Figure 13A:
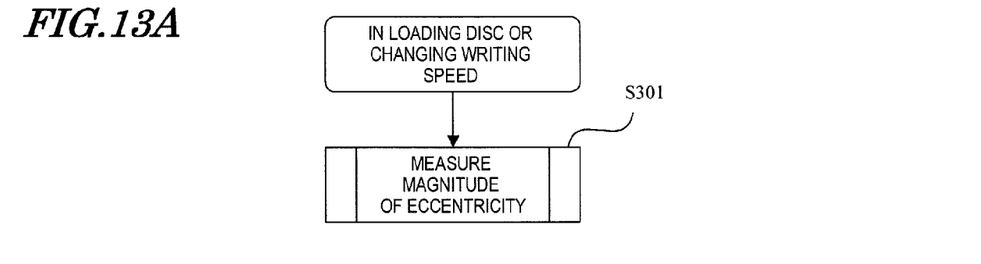
FIG. 13A is a flowchart showing how to measure the magnitude of eccentricity.
Figure 13B:
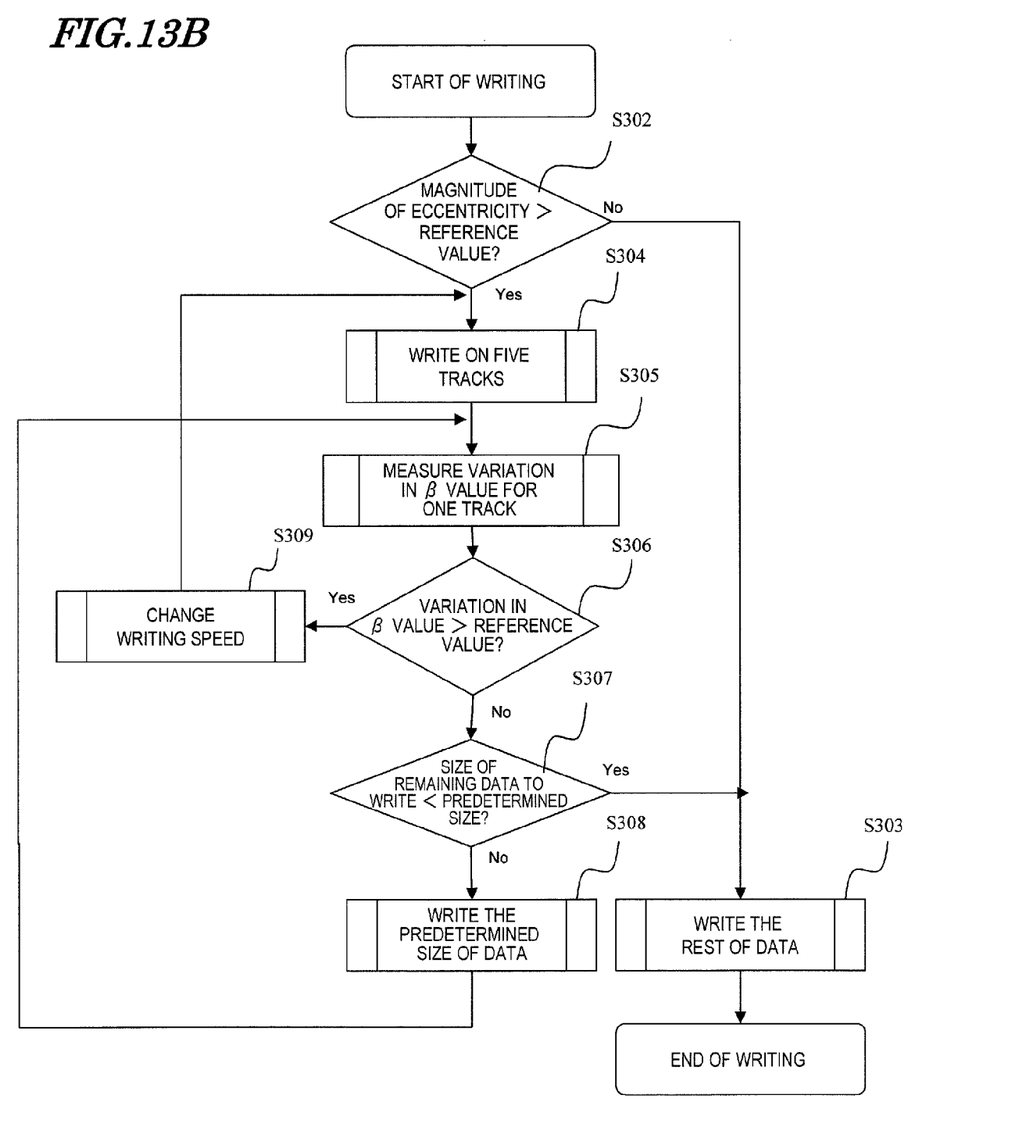
FIG. 13B is a flowchart showing how to measure the variation in β value and how to change the writing speed in a preferred embodiment of the present invention.

Next, it will be outlined with reference to FIGS. 13A and 13B exactly how to decrease the number of revolutions of an optical disc according to the magnitude of a variation in β value.

Now take a look at FIG. 13A first. According to this preferred embodiment, the magnitude of eccentricity of an optical disc is measured in Step S301 when the optical disc is loaded and when the reading/writing speed is changed. The magnitude of eccentricity may be measured in the following manner. Specifically, the optical disc is rotated with the tracking servo fixed. And the number of tracks crossed by the light beam spot per rotation of the optical disc is counted. In this case, the greater the magnitude of eccentricity, the larger the count. Counting may be done by the servo controller 106. And the magnitude of eccentricity is obtained by multiplying the number of tracks crossed by the light beam spot (i.e., the count) by the track pitch of the optical disc. In this preferred embodiment, the processor 108 shown in FIG. 11 calculates the magnitude of eccentricity based on the output of the servo controller 106. For that reason, according to this preferred embodiment, the servo controller 106 and the processor 108 together work as a magnitude of eccentricity measuring section.

Next, it will be described with reference to FIG. 13B how the optical drive operates after having started a write operation.

According to this preferred embodiment, when a write operation is started, the magnitude of eccentricity that has been measured as described above is compared to a reference value (in Step S302). The reference value is stored in a memory in advance.

In this preferred embodiment, if the magnitude of eccentricity is not greater than the reference value, the write operation is carried on as it is (in Step S303). However, if the magnitude of eccentricity is greater than the reference value, then a test write operation is performed on only five tracks, for example (in Step S304). Then, the β value of the central one of those five tracks that have been subjected to the test write operation is measured (in Step S305). In this manner, the variation in β value for one track (i.e., the variation in β value per rotation of the optical disc) can be obtained.

If the variation in β value is smaller than the reference value, then the drive determines in Step S307 whether or not the size of the data yet to be written is equal to or smaller than a predetermined value. If the answer is YES, all of the rest of the data is written in Step S303. On the other hand, if the answer is NO, a portion of the data with the predetermined size is written in Step S308 and a β value for one track is measured in Step S305 three tracks before the write operation is ended. And the drive once again sees in Step S306 if the variation in β value has exceeded the reference value.

If the drive has found the variation in β value greater than the reference value in Step S306, then the drive performs a writing speed changing processing step in Step S309. For example, if the write operation has been performed with the initial writing speed set to be 12×, then the number of revolutions of the motor is decreased so that the writing speed decreases to 8×, for example. After that, the process goes back to the processing step S304 to carry out the same series of processing steps all over again. But if the variation in β value is still greater than the reference value even at the 8× writing speed, then the number of revolutions of the motor may be decreased so that the writing speed decreases to 4× and the same series of processing steps may be performed all over again.

As described above, according to this preferred embodiment, the optical disc read/write drive senses, by variations in the magnitude of eccentricity and in β value, that resonances have been produced. If the degree of resonance is higher than a predetermined value, the number of revolutions of the motor is decreased to prevent the quantity of data written from being debased. And if it is not until the influence of the resonance actually manifests itself that the number of revolutions of the motor is decreased, the write operation can get done as quickly as possible.

In the preferred embodiment described above, if resonances have been produced, the number of revolutions is supposed to be decreased. However, as long as it is possible to avoid setting up resonances, the number of revolutions may be increased instead. For example, in the example shown in FIG. 8, if the initial writing speed is 12× and if resonance has been sensed, the resonance could be reduced even by increasing the writing speed to 14×.

Also, in the preferred embodiment described above, the magnitude of eccentricity is supposed to be measured before the β value is measured. However, this is not an indispensable processing step for the present invention. Furthermore, it could be determined, by comparing a variation in the degree of symmetry, the degree of modulation or the jitter, instead of the β value, to a reference value, whether or not the number of revolutions of the motor should be changed.

The present invention can be used in not just a BD recorder but also a recorder, a PC or any other optical disc apparatus with an optical disc drive. Among other things, the present invention is particularly effectively applicable to an optical disc apparatus with an optical pickup for a slim drive, which sacrifices the driving force of its actuator in order to reduce its size and cut down the power dissipation.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2009-288585 filed Dec. 21, 2009 and No. 2010-278912 filed Dec. 15, 2010, the entire contents of which are hereby incorporated by reference.

What is claimed is:

1. An optical disc apparatus for performing both the operation of writing data on an optical disc and the operation of reading data that is stored on the optical disc, the apparatus comprising:
   a motor for rotating the optical disc;
   an optical pickup, which irradiates the optical disc with a light beam and detects the light that has been reflected from the optical disc;
   an evaluation section for obtaining an indicative parameter of the distortion of a signal waveform representing the light reflected from a data stored part on the optical disc while the optical disc is being rotated by the motor;
   a control section for changing the number of revolutions of the optical disc per unit time if a variation in the indicative parameter of the distortion per rotation of the optical disc exceeds a threshold value while the optical disc is being rotated by the motor; and
   a measuring section for measuring the magnitude of eccentricity of the optical disc being rotated by the motor,
   wherein when the magnitude of eccentricity of the optical disc measured exceeds a reference value, the evaluation section detects the indicative parameter of the distortion.

2. The optical disc apparatus of claim 1, wherein the indicative parameter of the distortion of the signal waveform is at least one of a β value, the degree of asymmetry, the degree of modulation, and a jitter.

3. The optical disc apparatus of claim 1, wherein the measuring section measures the magnitude of eccentricity of the optical disc based on the light that has been reflected from the optical disc.

4. The optical disc apparatus of claim 1, wherein the apparatus has a size of 12.7 mm (which is comparable to 0.5 inches) or less as measured perpendicularly to the optical disc.

5. The optical disc apparatus of claim 1, wherein the apparatus is used as a recording device in a mobile personal computer.

6. A data writing method for writing data on an optical disc, the method comprising the steps of:
   A) rotating the optical disc;
   B) writing data on the optical disc by irradiating the optical disc with a light beam while rotating the optical disc;
   C) irradiating an area of the optical disc on which the data has been written with a light beam, thereby obtaining an indicative parameter of the distortion of a signal waveform representing its reflected light;
   D) changing the number of revolutions of the optical disc per unit time if a variation in the indicative parameter of the distortion per rotation of the optical disc exceeds a threshold value; and
   E) measuring the magnitude of eccentricity of the optical disc,
   wherein if the magnitude of eccentricity of the optical disc exceeds a reference value, the steps C) and D) are performed, but
   unless the magnitude of eccentricity of the optical disc exceeds the reference value, the steps C) and D) are not performed.

* * * * *